(12) United States Patent
Fredericks et al.

(10) Patent No.: US 9,779,384 B2
(45) Date of Patent: Oct. 3, 2017

(54) METHODS AND SYSTEMS FOR EXPENSE MANAGEMENT

(75) Inventors: Michael Fredericks, Fairfax, VA (US);
Joseph Dunnick, Baltimore, MD (US);
Valery Gorodnichev, Vernon, IL (US);
Jeanine Armstrong, Sea Cliff, NY (US)

(73) Assignee: CONCUR TECHNOLOGIES, INC., Redmond, WA (US)

( * ) Notice: Subject to any disclaimer, the term of this patent is extended or adjusted under 35 U.S.C. 154(b) by 0 days.

(21) Appl. No.: 13/117,303

(22) Filed: May 27, 2011

(65) Prior Publication Data

US 2012/0059745 A1   Mar. 8, 2012

Related U.S. Application Data

(63) Continuation of application No. 11/159,398, filed on Jun. 23, 2005, now Pat. No. 7,974,892.
(Continued)

(51) Int. Cl.
*G07F 19/00*   (2006.01)
*G06Q 10/10*   (2012.01)
(Continued)

(52) U.S. Cl.
CPC .......... *G06Q 10/10* (2013.01); *G06Q 20/102* (2013.01); *G06Q 20/24* (2013.01); *G06Q 40/00* (2013.01); *G06Q 40/12* (2013.12)

(58) Field of Classification Search
CPC ........ G06Q 40/00; G06Q 40/02; G06Q 40/10; G06Q 30/04; G06Q 20/10
(Continued)

(56) References Cited

U.S. PATENT DOCUMENTS 2,910,238 A   10/1959   Miles et al.
2,995,729 A   8/1961    Steele
(Continued)

FOREIGN PATENT DOCUMENTS

EP    0762306      3/1997
WO    WO 00/02152  1/2000
WO    WO 01/61607  8/2001

OTHER PUBLICATIONS

PR Newswire, Concur Technologies Launches Concur Expense 7.0, Jul. 24, 2003, p. 1.
(Continued)

*Primary Examiner* — Andrew Joseph Rudy
(74) *Attorney, Agent, or Firm* — DLA Piper LLP US

(57) ABSTRACT

Methods and systems for expense management, comprising: automatically detecting whether a credit card line item record created from a receipt record generated by processing an electronic feed of charges has been identified as a travel expense; identifying, based on a date of a charge of the electronic feed on credit card line item records, whether any of the credit card line item records identified occurred within a time period of an existing trip; automatically assigning any credit card line item records identified as an allowable expense and occurring during the time period for the existing trip for which one existing expense report exists, to an existing expense report; and automatically creating a newly created expense report and assigning to the newly created expense report any credit card line item records identified as an allowable expense and occurring during the time period for the existing trip for which no existing expense reports exists.

34 Claims, 6 Drawing Sheets

Related U.S. Application Data

(60) Provisional application No. 60/581,766, filed on Jun. 23, 2004.

(51) Int. Cl.
  *G06Q 20/10* (2012.01)
  *G06Q 20/24* (2012.01)
  *G06Q 40/00* (2012.01)

(58) Field of Classification Search
  USPC .................................................. 705/28, 30
  See application file for complete search history.

(56) References Cited

U.S. PATENT DOCUMENTS

| | | | |
|---|---|---|---|
| 3,253,262 | A | 5/1966 | Wilenitz et al. |
| 4,755,963 | A | 7/1988 | Denker et al. |
| 4,775,936 | A | 10/1988 | Jung |
| 4,845,625 | A | 7/1989 | Stannard |
| 4,857,840 | A | 8/1989 | Lanchais |
| 4,862,357 | A | 8/1989 | Ahlstrom et al. |
| 4,931,932 | A | 6/1990 | Dalnekoff et al. |
| 5,021,953 | A | 6/1991 | Webber et al. |
| 5,148,365 | A | 9/1992 | Dembo |
| 5,191,523 | A | 3/1993 | Whitesage |
| 5,237,499 | A | 8/1993 | Garback |
| 5,253,165 | A | 10/1993 | Leiseca et al. |
| 5,253,166 | A | 10/1993 | Dettelbach et al. |
| 5,255,184 | A | 10/1993 | Hornick et al. |
| 5,270,921 | A | 12/1993 | Hornick et al. |
| 5,272,638 | A | 12/1993 | Martin et al. |
| 5,283,575 | A | 2/1994 | Kao et al. |
| 5,331,546 | A | 7/1994 | Webber et al. |
| 5,343,388 | A | 8/1994 | Wedelin |
| 5,402,336 | A | 3/1995 | Spiegelhoff et al. |
| 5,570,283 | A | 10/1996 | Shoolery et al. |
| 5,623,413 | A | 4/1997 | Matheson et al. |
| 5,644,721 | A * | 7/1997 | Chung et al. ............... 705/6 |
| 5,648,900 | A * | 7/1997 | Bowen et al. ............... 705/5 |
| 5,652,867 | A | 7/1997 | Barlow et al. |
| 5,739,512 | A | 4/1998 | Tognazzini |
| 5,802,492 | A | 9/1998 | DeLorme et al. |
| 5,802,511 | A | 9/1998 | Kouchi et al. |
| 5,832,451 | A | 11/1998 | Flake et al. |
| 5,832,452 | A | 11/1998 | Schneider et al. |
| 5,832,453 | A | 11/1998 | O'Brien |
| 5,832,454 | A | 11/1998 | Jafri et al. |
| 5,850,617 | A | 12/1998 | Libby |
| 5,897,620 | A | 4/1999 | Walker et al. |
| 5,899,981 | A | 5/1999 | Taylor et al. |
| 5,948,040 | A | 9/1999 | Delorme et al. |
| 6,009,408 | A * | 12/1999 | Buchanan ................... 705/5 |
| 6,023,679 | A | 2/2000 | Acebo et al. |
| 6,029,144 | A | 2/2000 | Barrett et al. |
| 6,085,169 | A | 7/2000 | Walker et al. |
| 6,115,680 | A | 9/2000 | Coffee et al. |
| 6,199,050 | B1 | 3/2001 | Alaia et al. |
| 6,275,808 | B1 | 8/2001 | DeMarcken |
| 6,295,521 | B1 | 9/2001 | DeMarcken et al. |
| 6,298,328 | B1 | 10/2001 | Healy et al. |
| 6,307,572 | B1 | 10/2001 | Demarcken et al. |
| 6,336,097 | B1 | 1/2002 | Scipioni |
| 6,360,205 | B1 | 3/2002 | Iyengar et al. |
| 6,377,932 | B1 | 4/2002 | DeMarcken |
| 6,381,578 | B1 | 4/2002 | DeMarcken |
| 6,434,533 | B1 | 8/2002 | Fitzgerald |
| 6,442,526 | B1 * | 8/2002 | Vance et al. ............... 705/5 |
| 6,446,048 | B1 | 9/2002 | Wells et al. |
| 6,493,695 | B1 | 12/2002 | Pickering et al. |
| 6,553,346 | B1 | 4/2003 | Walker et al. |
| 6,609,098 | B1 | 8/2003 | DeMarcken |
| 6,711,474 | B1 | 3/2004 | Treyz et al. |
| 6,801,226 | B1 | 10/2004 | Daughtrey |
| 6,826,473 | B1 * | 11/2004 | Burch et al. ............... 701/467 |
| 6,847,824 | B1 | 1/2005 | Contractor |
| 6,868,400 | B1 | 3/2005 | Sundaresan et al. |
| 7,050,986 | B1 * | 5/2006 | Vance et al. ............... 705/5 |
| 7,103,558 | B1 | 9/2006 | Patton et al. |
| 7,158,980 | B2 | 1/2007 | Shen |
| 7,194,417 | B1 | 3/2007 | Jones |
| 7,249,041 | B2 | 7/2007 | Last |
| 7,263,664 | B1 | 8/2007 | Daughtrey |
| 7,277,923 | B2 | 10/2007 | Rensin et al. |
| 7,328,166 | B1 | 2/2008 | Geoghegan et al. |
| 7,330,110 | B1 | 2/2008 | Heintzman et al. |
| 7,343,295 | B2 | 3/2008 | Pomerance |
| 7,349,894 | B2 | 3/2008 | Barth et al. |
| 7,366,682 | B1 | 4/2008 | Katiyar et al. |
| 7,395,231 | B2 * | 7/2008 | Steury et al. ............... 705/34 |
| 7,409,643 | B2 | 8/2008 | Daughtrey |
| 7,483,883 | B2 | 1/2009 | Barth et al. |
| 7,493,261 | B2 | 2/2009 | Chen et al. |
| 7,502,746 | B2 | 3/2009 | Bertram et al. |
| 7,516,089 | B1 | 4/2009 | Walker et al. |
| 7,539,620 | B2 | 5/2009 | Winterton et al. |
| 7,548,615 | B2 | 6/2009 | Bhalgat et al. |
| 7,555,387 | B2 | 6/2009 | Sladky et al. |
| 7,746,510 | B2 | 6/2010 | Pandipati |
| 7,949,579 | B2 * | 5/2011 | Keld ............... G06Q 10/10 705/30 |
| 8,009,334 | B2 | 8/2011 | Pandipati |
| 8,195,194 | B1 | 6/2012 | Tseng |
| 8,203,765 | B2 | 6/2012 | Pandipati |
| 8,224,830 | B2 | 7/2012 | Bidlack |
| 8,271,337 | B1 | 9/2012 | Norins |
| 8,373,912 | B2 | 2/2013 | Pandipati |
| 8,560,355 | B2 | 10/2013 | Adamson et al. |
| 8,693,070 | B2 | 4/2014 | Pandipati |
| 8,706,580 | B2 * | 4/2014 | Houseworth ............... G06Q 10/10 705/31 |
| 8,766,795 | B1 | 7/2014 | Causey |
| 8,964,395 | B2 * | 2/2015 | Pav ............... G06F 1/20 165/122 |
| 2001/0042032 | A1 * | 11/2001 | Crawshaw et al. ............... 705/32 |
| 2001/0051911 | A1 | 12/2001 | Marks et al. |
| 2001/0053999 | A1 | 12/2001 | Feinberg |
| 2002/0007327 | A1 | 1/2002 | Steury et al. |
| 2002/0026416 | A1 | 2/2002 | Provinse |
| 2002/0029176 | A1 | 3/2002 | Carlson et al. |
| 2002/0042715 | A1 | 4/2002 | Kelley |
| 2002/0065688 | A1 | 5/2002 | Charlton et al. |
| 2002/0069093 | A1 | 6/2002 | Stanfield |
| 2002/0077871 | A1 | 6/2002 | Udelhoven et al. |
| 2002/0095256 | A1 | 7/2002 | Jones et al. |
| 2002/0100803 | A1 | 8/2002 | Sehr |
| 2002/0120765 | A1 | 8/2002 | Boehmke |
| 2002/0124067 | A1 | 9/2002 | Parupudi et al. |
| 2002/0128971 | A1 * | 9/2002 | Narasimhan ............... 705/51 |
| 2002/0147619 | A1 | 10/2002 | Floss et al. |
| 2002/0147678 | A1 * | 10/2002 | Drunsic ............... 705/39 |
| 2002/0152100 | A1 | 10/2002 | Chen et al. |
| 2002/0152101 | A1 * | 10/2002 | Lawson et al. ............... 705/6 |
| 2002/0161610 | A1 | 10/2002 | Walker et al. |
| 2002/0169509 | A1 | 11/2002 | Huang et al. |
| 2002/0173978 | A1 | 11/2002 | Boies et al. |
| 2003/0023463 | A1 | 1/2003 | Dombroski et al. |
| 2003/0036918 | A1 * | 2/2003 | Pintsov ............... 705/1 |
| 2003/0040987 | A1 | 2/2003 | Hudson et al. |
| 2003/0046195 | A1 * | 3/2003 | Mao ............... 705/30 |
| 2003/0065805 | A1 | 4/2003 | Barnes, Jr. |
| 2003/0088487 | A1 * | 5/2003 | Cheng et al. ............... 705/30 |
| 2003/0115141 | A1 | 6/2003 | Felix et al. |
| 2003/0120526 | A1 | 6/2003 | Altman et al. |
| 2003/0141411 | A1 | 7/2003 | Pandya |
| 2003/0171990 | A1 | 9/2003 | Rao et al. |
| 2003/0187705 | A1 | 10/2003 | Schiff |
| 2003/0225600 | A1 | 12/2003 | Slivka et al. |
| 2004/0002876 | A1 * | 1/2004 | Sommers et al. ............... 705/6 |
| 2004/0044674 | A1 | 3/2004 | Mohammadioun et al. |
| 2004/0083134 | A1 * | 4/2004 | Spero et al. ............... 705/16 |
| 2004/0128193 | A1 | 7/2004 | Brice et al. |
| 2004/0167808 | A1 * | 8/2004 | Fredericks et al. ............... 705/5 |
| 2004/0193457 | A1 | 9/2004 | Shogren |
| 2004/0198386 | A1 | 10/2004 | Dupray |

(56) References Cited

U.S. PATENT DOCUMENTS

| | | |
|---|---|---|
| 2004/0210497 A1* | 10/2004 | Hirayama et al. ............... 705/30 |
| 2004/0210513 A1 | 10/2004 | Harford et al. |
| 2004/0243489 A1* | 12/2004 | Mitchell et al. ................ 705/30 |
| 2004/0267555 A1 | 12/2004 | Dale |
| 2005/0004830 A1 | 1/2005 | Rozell et al. |
| 2005/0015272 A1 | 1/2005 | Wind |
| 2005/0015295 A1 | 1/2005 | McCulloch |
| 2005/0027705 A1 | 2/2005 | Sadri et al. |
| 2005/0033616 A1 | 2/2005 | Vavul et al. |
| 2005/0033668 A1* | 2/2005 | Garcia et al. ................... 705/30 |
| 2005/0108068 A1 | 5/2005 | Marcken et al. |
| 2005/0108069 A1 | 5/2005 | Shiran et al. |
| 2005/0108117 A1* | 5/2005 | Newman ......................... 705/30 |
| 2005/0131770 A1 | 6/2005 | Agrawal |
| 2005/0165680 A1 | 7/2005 | Keeling et al. |
| 2005/0203760 A1* | 9/2005 | Gottumukkala et al. ......... 705/1 |
| 2005/0222854 A1* | 10/2005 | Dale et al. ......................... 705/1 |
| 2005/0222944 A1* | 10/2005 | Dodson et al. ................. 705/39 |
| 2005/0240601 A1 | 10/2005 | Lyons et al. |
| 2005/0251430 A1 | 11/2005 | Jindel |
| 2005/0267787 A1 | 12/2005 | Rose |
| 2005/0288973 A1 | 12/2005 | Taylor et al. |
| 2005/0288976 A1 | 12/2005 | Abrams et al. |
| 2006/0046740 A1 | 3/2006 | Johnson |
| 2006/0053053 A1 | 3/2006 | Baggett |
| 2006/0069504 A1 | 3/2006 | Bradley et al. |
| 2006/0069592 A1 | 3/2006 | Di Florio et al. |
| 2006/0080126 A1 | 4/2006 | Greer et al. |
| 2006/0089907 A1 | 4/2006 | Kohlmaier et al. |
| 2006/0106655 A1 | 5/2006 | Lettovsky et al. |
| 2006/0167834 A1 | 7/2006 | Rubel, Jr. |
| 2006/0206363 A1 | 9/2006 | Gove |
| 2006/0206506 A1 | 9/2006 | Fitzpatrick |
| 2006/0212321 A1 | 9/2006 | Vance et al. |
| 2006/0241909 A1 | 10/2006 | Morgan et al. |
| 2006/0241983 A1 | 10/2006 | Viale et al. |
| 2006/0247993 A1 | 11/2006 | Scanlan et al. |
| 2006/0277079 A1 | 12/2006 | Gilligan et al. |
| 2006/0287880 A1 | 12/2006 | Fitzgerald et al. |
| 2006/0293931 A1 | 12/2006 | Fitzgerald et al. |
| 2007/0067193 A1 | 3/2007 | Robertson |
| 2007/0073562 A1 | 3/2007 | Brice et al. |
| 2007/0083401 A1 | 4/2007 | Vogel et al. |
| 2007/0094056 A1 | 4/2007 | Kang et al. |
| 2007/0143155 A1 | 6/2007 | Whitsett et al. |
| 2007/0179863 A1 | 8/2007 | Stoll |
| 2007/0250357 A1 | 10/2007 | Steury et al. |
| 2008/0052217 A1 | 2/2008 | Etkin |
| 2008/0072067 A1 | 3/2008 | Koretz |
| 2008/0082373 A1 | 4/2008 | Durocher et al. |
| 2008/0086455 A1 | 4/2008 | Meisels et al. |
| 2008/0097873 A1 | 4/2008 | Cohen et al. |
| 2008/0126143 A1 | 5/2008 | Altman et al. |
| 2008/0154876 A1 | 6/2008 | Hao |
| 2008/0167887 A1 | 7/2008 | Marcken |
| 2008/0189148 A1 | 8/2008 | Diaz et al. |
| 2008/0198761 A1 | 8/2008 | Murawski |
| 2008/0215406 A1 | 9/2008 | Pachon et al. |
| 2008/0221936 A1 | 9/2008 | Patterson |
| 2008/0262878 A1 | 10/2008 | Webby |
| 2008/0270224 A1 | 10/2008 | Portman et al. |
| 2008/0319808 A1* | 12/2008 | Wofford et al. .................. 705/6 |
| 2009/0006143 A1 | 1/2009 | Orttung et al. |
| 2009/0012824 A1 | 1/2009 | Brockway et al. |
| 2009/0099965 A1 | 4/2009 | Grant |
| 2009/0125321 A1 | 5/2009 | Charlebois et al. |
| 2009/0157513 A1 | 6/2009 | Bonev et al. |
| 2009/0187449 A1 | 7/2009 | Van Tulder et al. |
| 2009/0210262 A1 | 8/2009 | Rines |
| 2009/0216746 A1 | 8/2009 | Aubin et al. |
| 2009/0234818 A1 | 9/2009 | Lobo et al. |
| 2009/0271302 A1* | 10/2009 | Hamper .......................... 705/30 |
| 2010/0017316 A1 | 1/2010 | Joseph et al. |
| 2010/0045705 A1 | 2/2010 | Vertegaal |
| 2010/0057502 A1 | 3/2010 | Arguelles |
| 2010/0057503 A1 | 3/2010 | Katz |
| 2010/0121660 A1 | 5/2010 | Boykin |
| 2010/0175001 A1 | 7/2010 | Lazarus et al. |
| 2010/0191550 A1 | 7/2010 | Hutson |
| 2010/0198680 A1 | 8/2010 | Ma et al. |
| 2010/0228628 A1 | 9/2010 | Dufour |
| 2010/0257195 A1 | 10/2010 | Inoue et al. |
| 2010/0287250 A1 | 11/2010 | Carlson et al. |
| 2010/0305984 A1 | 12/2010 | Ben-Yitschak |
| 2011/0029413 A1* | 2/2011 | Ben-Tzur et al. ............... 705/28 |
| 2011/0045801 A1 | 2/2011 | Parker, II |
| 2011/0060480 A1 | 3/2011 | Mottla |
| 2011/0137768 A1 | 6/2011 | Onishi et al. |
| 2011/0246246 A1 | 10/2011 | Johnson |
| 2011/0258005 A1 | 10/2011 | Fredericks et al. |
| 2011/0270715 A1 | 11/2011 | Moorhead |
| 2011/0282964 A1 | 11/2011 | Krishnaswamy |
| 2011/0288768 A1 | 11/2011 | Stefani et al. |
| 2011/0307280 A1 | 12/2011 | Mandelbaum |
| 2012/0046049 A1 | 2/2012 | Curtis |
| 2012/0157795 A1 | 6/2012 | Chiu et al. |
| 2012/0185368 A1 | 7/2012 | Schloter et al. |
| 2012/0209640 A1 | 8/2012 | Hamper |
| 2012/0281584 A1 | 11/2012 | Powers |
| 2012/0321281 A1 | 12/2012 | Hilem |
| 2012/0330906 A1 | 12/2012 | Fredericks et al. |
| 2013/0041696 A1 | 2/2013 | Richard |
| 2013/0090966 A1 | 4/2013 | Rivere |
| 2013/0166607 A1 | 6/2013 | Turk et al. |
| 2013/0268878 A1 | 10/2013 | Le Roux et al. |
| 2013/0329943 A1 | 12/2013 | Christopulos et al. |
| 2014/0350972 A1 | 11/2014 | Haywood et al. |

OTHER PUBLICATIONS

"Gelco Information", Business Wire, Mar. 17, 1998.
"American Express Announces New Features in the latest Release of AXI(SM) at Corporate Travel World", PR Newswire, Mar. 2, 1998, p0302NYM159.
File History of U.S. Appl. No. 10/373,096.
File History of U.S. Appl. No. 10/270,672.
File History of U.S. Appl. No. 11/159,398.
File History of U.S. Appl. No. 12,755,127.
File History of U.S. Appl. No. 12,773,282.
"Thread: Pay Per Impression Programs", Digital Point Forums, Mar. 2005, found online at forums.digitalpoint.com/showthread.php?t=12248.
Nancy Trejos, "Travelers have no patience for slow mobile websites", dated May 6, 2012, http://www.usatoday.com/USCP/PNI/Features/2012-05-06-PNI0506tra-website-speedART_ST_U.htm.
Gary Stoller, "For Travel Companies, the slower the website, the smaller the potential profit", dated Jun. 1, 2011, http://www.usatoday.com/MONEY/usaedition/2011-06-02-travelweb-27ART_CV_U.htm.
Oct. 22, 2009, "Suppliers Work on Ancillary Air Fee Reporting" McNulty Business Travel News.
File History of U.S. Appl. No. 11/774,489.
File History of U.S. Appl. No. 12/371,548.
File History of U.S. Appl. No. 13/277,923.
File History of U.S. Appl. No. 13/602,589.
www.concur.com, from Web Archive, http://web.archive.org/web/20000622043004/http://www.concur.com/, archived Jun. 22, 2000, printed Jan. 6, 2014 (61 pages).
www.outtask.com, from Web Archive, http://web.archive.org/web/20001009025559/http://www.outtask.com/, archived Oct. 9, 2000, printed Jan. 6, 2014 (8 pages).
Joseph Kornick, "Firm's new system tracks, refunds unused e-tickets" Travel Weekly, May 20, 1999.
Tripit, "Flight Duplicates: Conflict Resolved", Sep. 13, 2010, Concur, 3 pages.
File History of U.S. Appl. No. 09/784,836.
File History of U.S. Appl. No. 10/225,736.
File History of U.S. Appl. No. 11/983,949.
Juile Barker, "Keeping Control When Hotel Costs Soar", Successful Meetings, vol. 47, No. 3, pp. 31, Mar. 1998.

(56) References Cited

OTHER PUBLICATIONS

David Eisen, "Setting Up a Hotel Program", Business Travel News, vol. 23, No. 7, pp. 58(8) Apr. 24, 2006.
Edward P. Gilligan, "Trimming Your T&E is Easier Than You Think", Managing Office Technology, vol. 40, No. 11, pp. 39-40, Nov. 1995.
Mal Gormley, "NBAA's Travel$ense", Business and Commercial Aviation, vol. 79, No. 2, pp. 60, Aug. 29, 1996.
Eric K. Clemons et al., "Ahead of the Pack Through Vision and Hustle: A Case Study of Information Technology at Rosenbluth Travel", IEEE, pp. 287-296 (1991).
Bruce Schumacher, "Proactive Flights Schedule Evaluation at Delta Air Lines", Proceedings of the 1999 Winter Simulation Conference, pp. 1232-1237 (1999).
Paul Katz et al., "Making the Most of a Telephone Company's Purchasing Power", Belcore Exchange, pp. 23-27, Mar./Apr. 1990.
Amir A. Sadrian et al., "A Procurement Decision Support System in Business Volume Discount Environments", Operations Research, vol. 42, No. 1, pp. 14-23, Jan.-Feb. 1994.
Amir A. Sadrian et al., "Business Volume Discount: A New Perspective on Discount Pricing Strategy", The National Association of Purchasing Management, Inc., pp. 43-46, Apr. 1992.
James V. Jucker et al., "Single-Period Inventory Models with Demand Uncertainty and Quantity Discounts: Behavioral Implications and a New Solution Procedure", Naval Research Logistics Quarterly, vol. 32, pp. 537-550 (1985).
Robert J. Dolan, "Quantity Discounts: Managerial Issues and Research Opportunities", Marketing Science, vol. 6, No. 1, pp. 1-24, Winter 1987.
Z. Drezner et al., "Theory and Methodology: Multi-buyer discount pricing", European Journal of Operational Research, vol. 40, pp. 38-42 (1989).
Hasan Pirkul et al., "Capacitated Multiple Item Ordering Problem with Quantity Discounts", IIE Transactions, vol. 17, No. 3, pp. 206-211, Sep. 1985.
Paul Katz et al., "Telephone Companies Analyze Price Quotations with Bellcore's PDSS Software", Interfaces 24, pp. 50-63, Jan. 1-Feb. 1994.
Ram Narasimhan et al., "Optimizing Aggregate Procurement Allocation Decisions", Journal of Purchasing and Materials Management, pp. 23-30, May 1986.
James C. Bean et al., "Reducing Travelling Costs and Player Fatigue in the National Basketball Association", Interfaces, vol. 10, No. 3, pp. 98-102, Jun. 1980.
Gerard Francois, "Socrate: Un Projet Strategique de al SNCF au Services des Voyageures", Revue Generale Des Chemins De Fer, Suppl. No. 6, pp. 7-9, Jun. 1990.
Robert A. Russell et al., "Devising a Cost Effective Schedule for a Baseball League", Operations Research, vol. 42, No. 4, pp. 614-625, Jul.-Aug. 1994.
Jacques A. Ferland et al., "Computer Aided Scheduling for a Sport League", Infor., vol. 29, No. 1, pp. 14-25, Feb. 1991.
Jeffrey L. Huisingh et al., "OffSite: Federal Employee Training Site Selection Software", US Army Tradoc Analysis Center—Monterey Technical Report No. 98-02, Nov. 1998 (163 pages).
Jeffrey Huisingh et al., "New Travel Software Save Time, Money", http://www.dla.mil/Dimensions/Septoct99/Sep98//Sep_page_19.htm, Sep./Oct. 1998 (5 pages).
David A. Shepherd, "A Slam Model of Domestic Airline Passenger Fares and the Contract Air Service Program", Air Force Inst. of Tech., Wright-Patterson AFG, OH. School of Systems and Logistics, Sep. 1986 (136 pages).
R.A. Russell, "Scheduling the Texas League with Multiple Objectives", 1994 Proceedings Decisions Sciences Institute, pp. 1248-1250,1994.
D. Bartholomew, "Cleared for Takeoff", InformationWeek, pp. 55, Mar. 1993.
Matthew E. Berge et al., "Demand Drive Dispatch: A method for Dynamic Aircraft Capacity Assignment, Models and Algorithms", Operations Research, vol. 41, No. 1, pp. 153-168, Jan.-Feb. 1993.
File History of U.S. Appl. No. 11/763,562.
File History of U.S. Appl. No. 13/593,108.
File History of U.S. Appl. No. 13/606,494.
File History of U.S. Appl. No. 13/712,614.
File History of U.S. Appl. No. 13/830,319.
File History of U.S. Appl. No. 14/036,320.
File History of U.S. Appl. No. 14/188,414.
File History of U.S. Appl. No. 12/773,282.
File History of U.S. Appl. No. 13/277,916.
File History of U.S. Appl. No. 13/396,255.
File History of U.S. Appl. No. 13/712,629.
File History of U.S. Appl. No. 13/830,410.
File History of U.S. Appl. No. 14/060,960.
File History of U.S. Appl. No. 14/219,745.
File History of U.S. Appl. No. 12/465,067.
File History of U.S. Appl. No. 14/997,019.
File History of U.S. Appl. No. 15/489,361.
File History of U.S. Appl. No. 15/602,872.
File History of U.S. Appl. No. 14/213,550.
File History of U.S. Appl. No. 12/755,127.
File History of U.S. Appl. No. 12/901,947.
File History of U.S. Appl. No. 13/842,913.
File History of U.S. Appl. No. 14/213,523.
File History of U.S. Appl. No. 14/994,822.
File History of U.S. Appl. No. 15/137,196.
File History of U.S. Appl. No. 14/213,550, electronically captured from PAIR on Aug. 3, 2017 for Jul. 17, 2017 to Aug. 3, 2017.

* cited by examiner

FIGURE 4

Outtask Vinnel – Microsoft Internet Explorer

Vinnet  Menu  Reports  | Save | Submit | Print | Help | Online

| Expense Details | Exceptions | Import | Report Settings | Report Summary |

Hotel Folio Import (04/29/2005 – 05/06/2005)

HILTON
DIVISION STR 200
CHICAGO, IL 66208
1-773-312-2133

Amount $674.45          Date: 05/27/2005

Estimated Tax Paid: $ 23.45

Guest Name: SMITH/J     Check In Date: 05/25/2005     Check Out Date: 05/27/2005

Number of Nights: 2
Room Rate Information
Date: 05/25/2005    Type: GUEST ROOM SINGLE    Amount: $ 304.38
Date: 05/25/2005    Type: OCCUPANCY TAX        Amount: $ 5.16
Date: 05/25/2005    Type: CITY TAX             Amount: $ 7.74
Date: 05/26/2005    Type: GUEST ROOM SINGLE    Amount: $ 278.50
Date: 05/26/2005    Type: OCCUPANCY TAX        Amount: $ 4.22
Date: 05/26/2005    Type: CITY TAX             Amount: $ 8.34

Room Type: D
Portfolio Details
Date: 05/25/2005    Telephone: $ 3.21     Description: TELEPHONE-LD (INTERSTATE)
Date: 05/27/2005    Telephone: $ 1.61     Description: TELEPHONE-LOCAL
Date: 05/27/2005    Restaurant: $22.48    Description: Hotel Restaurant
Date: 05/27/2005    Movies: $4.81         Description: Movie Rental Status

| | CDW COMPUTER CENTERS | 05/30/2005 | $600.42 |
| | STAPLES OFFICE SUPPLIES | 05/30/2005 | $79.57 |

☐ ✓ Mark All Charges                    | Import | X Remove | Find Matches |

Expense List    + Add new Expense    Total $ Items $0.00    Total Due Employee $0.00

| Type | Date | Itinerary | Amount | Pay Method | Details |

Done                                                            Local intranet

FIGURE 5

Expense Type

[Personal]

ID: [8000]

Description: [Personal] [...]

General Ledger: [00 ⌄]

Forced Payment Method: [None ⌄]

Detail Form: [Personal ⌄]   [None ⌄]

☐ Project Required

Minimum amount for receipt required:  ⦿ Use default Value of $0.01
　　　　　　　　　　　　　　　　　　　○ Use Custom Value Require Paper Receipt even if e-receipt present: [No ⌄]

"Help Text" shown when adding this expense (HTML Client Only):

[　　　　　　　　　　　　　　]

Semantic Properties
　　Check the box(es) that help define this expense if any are aplicable
Hotel Portfolio Import

- ☐ Audio / Visual
- ☐ Banquet Facilities
- ☐ Business Center (copies, faxes, etc.)
- ☐ Cash Advance/Disbursement
- ☐ Conference Room
- ☐ Early Departure Charges
- ☑ Gift Shop
- ☐ Gratuities/Tips
- ☐ Health Club
- ☐ Internet Access
- ☐ Laundry/Dry Cleaning
- ☐ Lounge Bar
- ☑ Mini-bar
- ☑ Movies
- ☐ Restaurant
- ☐ Room Service
- ☐ Telephone
- ☐ Transportation (e.g. Hotel Limousine)
- ☐ Valet Parking

FIGURE 6

| Outtask Vinnei – Microsoft Internet Explorer | | | | | |
|---|---|---|---|---|---|
| Vinnet Menu Reports | Save | Submit | Print | Help | Online |

Expense Details | Exceptions | Import | Report Settings | Report Summary

Editing Expense         Hotel Folio Import (04/29/2005 – 05/06/2005)

| Expense Type | Date | Amount Spent | | Pay Method |
|---|---|---|---|---|
| Telephone/Fax | 05/25/20005 | 3.21 | $ - (USD) | |

| Itinerary | Portfolio |
|---|---|
| Test | Portfolio - $ 674.45 – 05/27/2005 |

| Cost Center | Project | Location |
|---|---|---|
| Research and Development (11) | | |

| Task | Award |
|---|---|
| | |

Commetns

Telephone-LD (INTERSTATE)

Apply Charges    Cancel    Split    Duplicate

Expense List   + Add new Expense   Total $ Items $ 674.45   Total Due Employee $0.00

| | Type | Date | Itinerary | Amount | Pay Method | Details |
|---|---|---|---|---|---|---|
| ✎ X | Portfolio | 05/27/2005 | Test | $ 674.45 | MC 2 | |
| ✎ X | Hotel | 05/25/2005 | Test | $ 353.28 | MC 2 | ▽ |
| ✎ X | Telephone/Fax | 05/25/2005 | Test | $ 3.21 | MC 2 | |
| ✎ X | Hotel | 05/26/2005 | Test | $ 289.06 | MC 2 | ▽ |
| ✎ X | Meals | 05/27/2005 | Test | $ 22.45 | MC 2 | |
| ✎ X | Telepone/Fax | 05/27/2005 | Test | $1.81 | MC 2 | |
| ✎ X | Personal | 05/27/2005 | Test | $ 4.81 | MC 2 | |

Done                                      Local intranet ved by expense management system 100 are scrutinized

METHODS AND SYSTEMS FOR EXPENSE MANAGEMENT

CROSS-REFERENCE TO RELATED APPLICATIONS

This application is a continuation of U.S. patent application Ser. No. 11/159,398, filed Jun. 23, 2005, which claims priority from U.S. Provisional Application Ser. No. 60/581,766, filed Jun. 23, 2004. The entirety of that provisional application is incorporated herein by reference.

FIELD OF THE INVENTION

The present invention relates to the field of expense reporting.

BRIEF DESCRIPTION OF THE FIGURES

FIGS. 3-6 are exemplary screen shots, according to one embodiment of the present invention.

DESCRIPTION OF EMBODIMENTS OF THE INVENTION

Figure 1:
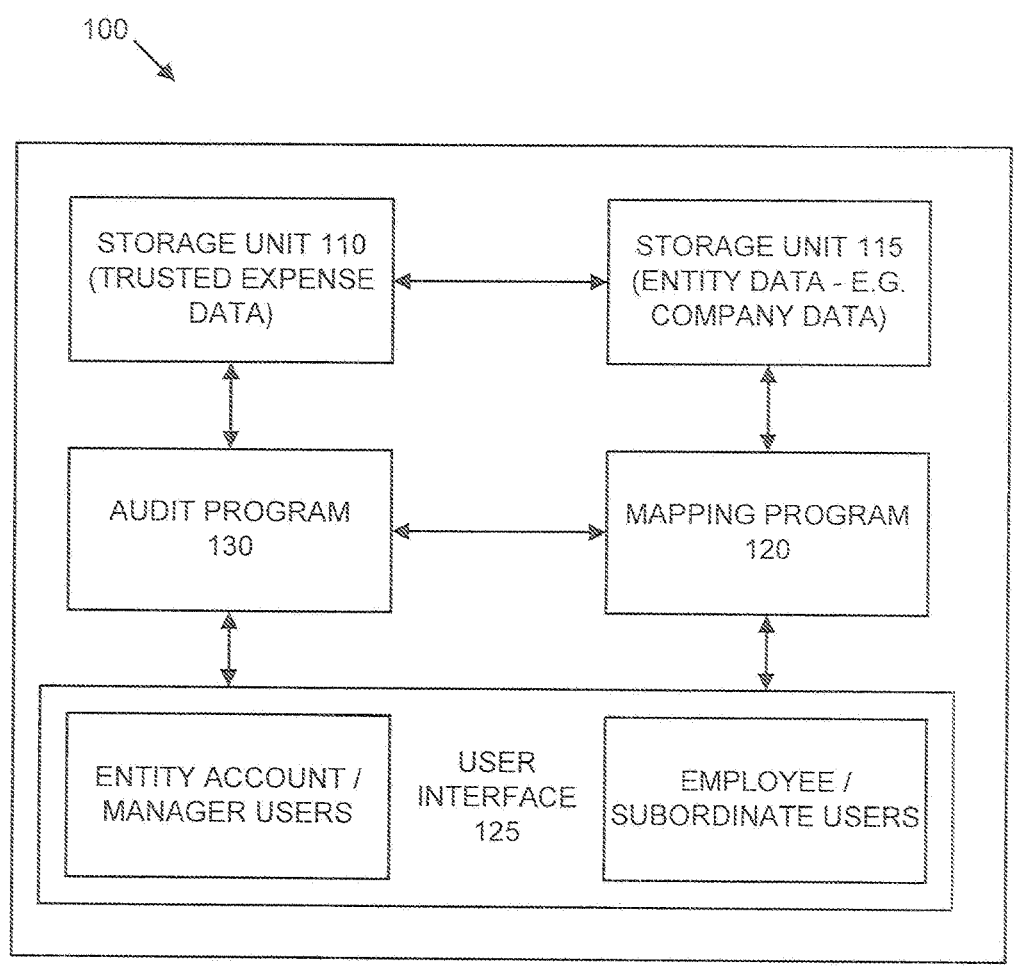
FIG. 1 illustrates the primary components of a representative operating environment, according to one embodiment of the present invention.

FIG. 1 illustrates an expense management system 100, according to one embodiment of the present invention. Expense management system 100 imports trusted itemized data and maps the data to defined expense types. The expense management system 100 comprises: storage units 110 and 115; a mapping program 120; an audit program 130; and a user interface 125.

FIG. 1 depicts storage units 110 and 115. However, these storage units are combinable in other embodiments. Storage unit 110 contains trusted itemized expense data, which is transmitted or obtained from any trusted source (e.g., credit card companies or any vendor that provides receipts in an electronic form). It should be noted that either all of the expense data or just a portion of the expense data can be itemized. Expense data can come in a form that identifies the location of the purchase, the amount of the total transaction, the amount and written description of the itemized sub-transactions, and a system-specific code which also describes or categorizes the sub-transactions. Storage unit 110 stores a master expense type list containing the complete domain of possible expense types utilized in expense management system 100. Expense types are associated with an identifier, a description, a general ledger or other accounting code, a list of data fields to be supplied on the expense report, or corporate policy information, or any combination thereof.

Company specific data to be utilized by expense management system 100 is stored in storage unit 115. Companies can select a sub-domain from the domain of the master expense type list. This sub-domain is typically derived from company needs in relation to control or accounting polices, or tax considerations. For additional mapping purposes, other codes or identifiers can be attached to the expense types in the sub-domain to facilitate various company functions. For example, an accounting code or identifier can be assigned to an expense type to allow the expense report to be imported into other company reports. Storage unit 115 also stores expense reports after and during processing by mapping program 120.

Mapping program 120 maps the trusted itemized expense data, stored in storage unit 110, to the domain of expense types selected by a company using expense management system 100. Prior to mapping expense data, the program correlates vendor expense codes to company-selected expense types. The correlation can match any number of expense codes to any number of expense types, and the program is customizable to incorporate corporate policies, desires and/or tax considerations. To perform the mapping operation, the expense codes assigned to the expense data can be read from the trusted source, or a vendor (e.g., hotel or rental car company), for each expense, itemized or not, and then the correlated expense types are assigned to each expense.

To facilitate mapping accuracy, one embodiment utilizes a filtering system that searches for key words in the trusted data (e.g., the filter searches expense descriptions in the trusted data for the key word "Internet" because some vendors use the same numerical expense code for telephone and Internet charges). The filter is customizable to cater to the weaknesses or idiosyncrasies of each trusted source or vendor, which in turn can improve overall system performance when more than one trusted source is providing expense data.

In one embodiment, the user interface 125 allows for at least two types of users. (However, in another embodiment, only one type of user can also be used in user interface 125.) First, company accountants/managers ("managers") provide expense management system 100 with company-specific information, which is then stored in storage unit 115. As discussed supra, managers can pick expense types from the master list of expense types to utilize, which when selected constitute the domain of expense types available to expense management system 100 for mapping purposes. Also, managers can assign additional data to the expense types to facilitate other company specific functions (e.g., company specific accounting codes can be assigned to the expense types to facilitate importing mapped expense data to other company systems). Managers also interact with expense management unit system 100 through auditing program 130.

Second, employees or travelers (e.g., those receiving the goods listed in the itemized expense data) primarily interface with expense management system 100 by editing and approving the mapped expense data, which is used to generate the final approved expense report. Additionally, expense management system 100 is customizable to allow employees to manually change the expense type assigned to imported expense data, or to allow employees to manually enter in expense data that was not or could not be imported by expense management system 100 though the trusted source.

In one embodiment, an audit program 130 allows managers to control and approve corrections made by employees to the mapped expense data. When an employee makes a change to the mapped expense data (e.g., by assigning the itemized expense data to a different expense types or correcting a line item amount), the change is flagged for auditing. This flagging process can happen in a number of ways with similar results. In one embodiment, to identify the changed mapping or transaction amounts, expense management system 100 will save a copy of the original mapped expense data and compare it with user-changed data. Thus, changes made outside the automated mapping process provided by expense management system 100 are scrutinized ensuring greater accuracy and preventing fraud. Auditing program 130 is customizable (e.g., programmed with tolerances or filters) to enable the system to only flag changes that meet (or do not meet) selected criterion (e.g., changes that are greater than a certain percentage or that map expense line items to the "personal" expense type will automatically be approved).

Figure 2:
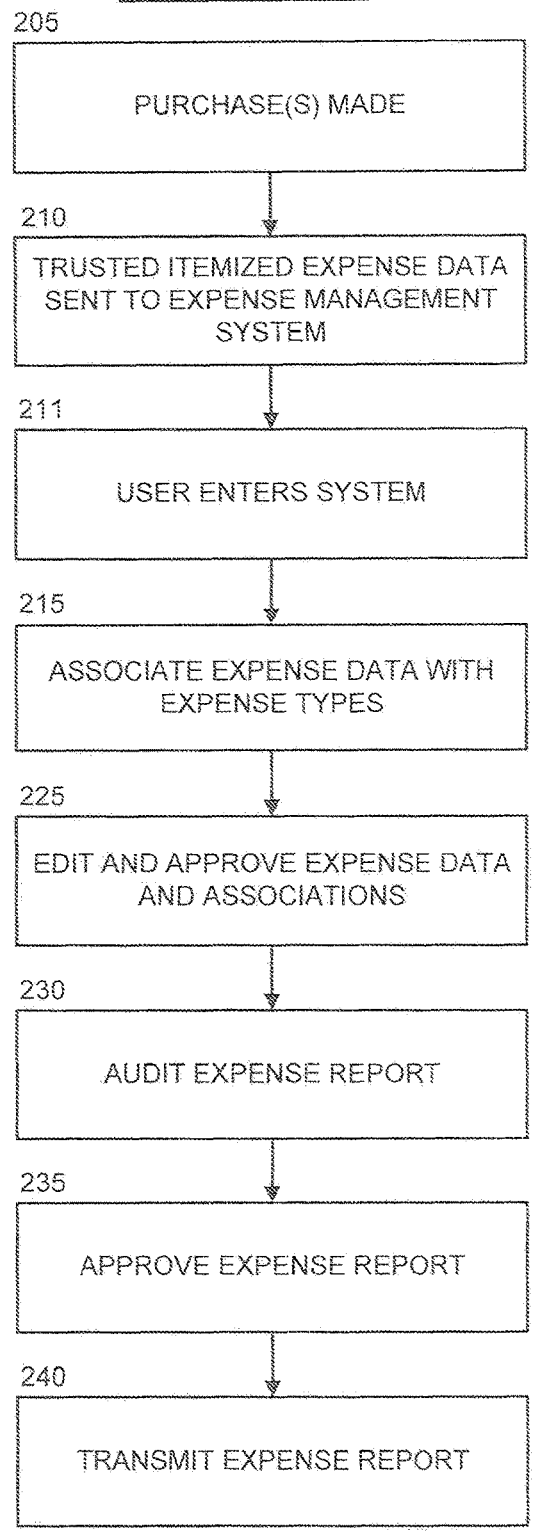
FIG. 2 illustrates a method of expense management, according to one embodiment of the present invention.

FIG. 2 illustrates a method of expense management, according to one embodiment of the present invention. FIG. 2 is explained in the context of purchases made with a hotel or car rental company. These examples in no way limit the applicability of the novel systems and methods disclosed herein.

In step 205, purchase(s) are made by an individual or entity (e.g., employee, traveler), who will eventually be responsible to submit an expense report accounting for the purchase(s). Although any individual or entity can be used in the example embodiment of FIG. 2, an employee will be used for demonstration purposes. Those skilled in the art will recognize that any individual or entity can use the present invention.

In one embodiment, the employee charges various expenses to a company credit card. In a hotel example, an employee purchases lodging, personal telephone calls, business telephone calls, mini-bar items, room service, meals at the hotel restaurant, Internet use, valet service, etc. The hotel purchases are made with a company assigned credit card, which is issued by a credit card company that has an agreement with the hotel to provide trusted itemized expense data.

Those skilled in the art will recognize that there are other methods of payment that could be used. The credit card vendors (e.g., MasterCard, Visa, American Express, Diners, etc.) provide data feeds to their customers containing information about all transactions involving the credit cards issued to the employees at their company. Those skilled in the art will recognize that there are other sources for data feeds, including the merchants themselves. The data feeds are typically electronic text files. The degree of detail contained may vary by data feed, as the credit card vendors typically have different data feed products and products with more detail may cost more to obtain. Within a given electronic text file, the level of detail may vary from transaction to transaction as not all merchants provide the same level of detail to the credit card vendors about purchases made by travelers. In one embodiment, certain data feed products would include hotel portfolio data (i.e., line-item detail breaking down the individual expenses on hotel receipts), referred to as sub-transactions, from hotel merchants who choose to participate in the providing such detail. It should be noted that expense management system 100 is still operative if only some, or even none, of the expense data is broken into sub-transactions. Those skilled in the art will understand that the exact format of the electronic text files may vary and that there are many other possible methods of transmission.

In step 210, the trusted itemized expense data is sent to expense management system 100. In one embodiment, the expense management system 10 imports electronic text with transaction data and analyzes it to identify the employees who charged each of the transactions. Thus, after the employee's trip is over, the employer receives an electronic data stream of the expense data (some of which has been broken into sub-transactions), which is then fed into expense management system 100.

Figure 3:

In step 211, at some point in the process, the employee gains access to the system and sees a list of corporate card charges ready to be imported. For example, the employee could see a list of charges on his corporate credit card, some of which are from hotels that have an agreement to provide sub-transaction data to the company through the corporate credit card. FIG. 3 is an example screen shot illustrating credit card data, according to one embodiment of the invention. The user can review sub-transaction data from hotels or other sources that have agreed to provide such data. In one embodiment, the user can place his mouse icon over such charges in order to see the sub-transactions (line items). In the hotel example, these sub-transactions should match the receipt that the user received upon check-out from the hotel. FIG. 4 illustrates an example of such sub-transaction data, according to one embodiment of the invention.

It should be noted that, in one embodiment, step 211 is optional, and the expense report may be automatically generated. For example, expense reports could be automatically generated on a periodic basis from corporate card data because a certain entity had many employees without Internet access.

It should also be noted that expense reports serve multiple purposes including, but not limited to, allowing the employee to be reimbursed for approved out-of-pocket expenses incurred during business travel. Expense management tools often include the capability of automatically paying credit card bills for company-issued credit cards. Employees are also often liable for expenses charged to these company-issued credit cards that are not approved by the employer or not authorized by company procedure. Thus, employees often include expenses from company-issued credit cards in their expense reports to obtain the required approval and to automate payment.

In step 215, expense management system 100 reads the expense codes in the expense data and maps all possible line items to their appropriate expense types. In step 211, the employee has imported charges that need to be reimbursed for a particular expense report. As shown in FIG. 6, in importing charges with sub-transaction data, such as a hotel charge, the charge comes into the expense report already broken down. With a hotel example, the hotel room comes in designated as a hotel expense, the two phone calls come in designated as telephone/fax, the restaurant comes in designated as a meal, and the movie (which is not reimbursable under company policy), comes in designated as personal. This procedure has saved time for the employee and increased accuracy, as people often either mis-key their receipt entry, or choose not to include certain itemizations because it is too time-consuming. These decisions can be detrimental to a company. For example, a company may not be able to fully take deductions for certain items (e.g., meals) that are taxed as a beneficial rate.

Note that in setting up expense management system 100, the company has selected expense types to utilize (e.g., based on internal controls and policies, tax requirements). For example, the line item for the lodging expense is assigned the expense code "395," which correlates to the expense type "travel-lodging," which is one of the expense types the company using expense management system 100 selected from the master expense type list.

In the rental car example, the rental car company charges the employee for the daily rental car rate, insurance, over mileage fee, refueling, etc. Instead of using a credit card to record and transmit the expense data 210, as illustrated in the hotel example, the rental car company has an arrangement with the employer (or a service that manages expenses for the employer) to send expense data directly to them in the form of trusted receipts. Is should be noted that almost all vendors, not just rental car companies or hotels, have the potential to provide electronic trusted receipts. Although the data from these receipts are different from that of the trusted expense data feeds from the credit card companies, expense management system 100 can still process this trusted receipts in a similar way—mapping the itemized expenses to appropriate expense types.

In one embodiment, expense management system 100 maintains a master list of expense types. Company accountants or managers choose from this list of expense types when creating a domain of expense types that will be used by the company or a department in the company. Those skilled in the art will recognize that an expense management system could contain multiple master lists of expense types, and that different groups of users within a company could use different lists. When expense items are imported the expense management system chooses the expense type based on semantic information added to each expense type on the master list. This semantic type information could be an integer code.

In one embodiment, semantic information can be added to all expense types. In other embodiments, semantic information can be added to only a subset of expense types, or no expense types at all. The user can determine which embodiment best fits the user's needs. For example, if the user has an expense in their system for "equipment repair", this is not an expense type that is returned by any of the hotel providers, so it would never get a hotel semantic term. However, if the trusted source, such as a rental car provider, does have the expense type "equipment repair", then this expense would get a rental car provider semantic term.

Those skilled in the art will recognize that there are many methods for storing semantic information. The semantic information provides a mapping between the possible list of types for the sub-transactions and the expense types in the expense management system. For example, the semantic information could indicate which expense type is to be used when importing a telephone charge, or an in-room movie. When a sub-transaction is imported, the type information from that sub-transaction is cross-referenced with the list of expense types to try to find an expense type with semantic information indicating that it is the correct type to use for this type of sub-transaction. If a match is found then the line item is imported with this type. For example, an Internet charge could be designated by the hotel as a phone charge, expense type. However, a semantic search of the sub-transaction would reveal the word Internet to show that the Internet charge was for the Internet and not the phone.

FIG. 5 is an exemplary screen shot illustrating how expense types are associated with semantics, according to one embodiment of the invention. The expense type is "personal". The semantics associated with personal expenses include gift shop, mini-bar, and movies, according to this particular company's policies.

In a further embodiment, the expense management system maintains a master list of accounting codes, including but not necessarily limited to cost centers, general ledger codes, and project codes. End users may choose from this list of accounting codes when creating expenses. The system may be configured to restrict the codes that a given user may use. Those skilled in the art will recognize that perhaps no codes are used for a given expense, but on other expenses multiple codes may be necessary. When an expense transaction is imported and the expense management system detects that this transaction has been assigned to multiple accounting codes, the accounting code information stored on the sub-transactions can be read and then used to choose the values for the corresponding expense items on the expense report. The billing codes include, but are not limited to, cost centers (e.g., marketing department), a project (e.g., a particular matter), and an identifier that maps to a classification used in a company's accounting system (e.g., an air ticket may be designated differently from lodging for tax purposes).

In step 225, the employee is able to edit and approve the expense data and mapping. If an expense is mapped to more than one expense type, then the employee can select the appropriate type from the available options. If no expense type or the wrong type is assigned, then the employee can change the assigned expense type. For example, when the employee reviews the mapped hotel expense data, he or she realizes that the personal telephone calls have been included with the business telephone expense and mapped to the "travel-phone" expense type. To correct the error, the employee is able to edit this expense and parse the business from the personal calls and, in addition, the employee maps the personal telephone calls to the "personal" expense type. When the employee has reviewed all the expenses and assigned expense types where needed, the employee can approve, or sign off on, the mapped data.

In step 230, expense management system 100 is optionally able to audit the expense report. Expense management system 100 contains an audit module that can automatically compare the original transactions and sub-transactions from the data feed with the expenses actually submitted to detect differences between the two. For example, if a hotel receipt contained $100 for a room, $50 for meals and $10 for an in-room movie, but the expense report contains $100 for the room and $60 for meals, the audit module would detect this. Those skilled in the art will recognize that there are many ways to implement such an audit module including, but not limited to, a database query that compares relational database entries containing the expense reports and the original transactions and sub-transactions. Those skilled in the art will recognize that there are many ways to present the information regarding the expense reports which deviate from the data feed, such as in tabular format on-screen or in a spreadsheet file which can be read by an application such as Microsoft Excel.

In one embodiment, the audit module can be configured to have tolerances or filters, which can automatically approve a difference between the expense report and the imported data because the difference meets the programmed criteria. A zero-tolerance program would present all reports that differ by any amount, whereas a 1 percent tolerance would present reports where the difference is greater than 1 percent. Those skilled in the art will recognize that tolerances or filters can be presented in forms other than percentages.

When an employee changes an expense amount or mapping, expense management system 100 flags this change for auditing. This flagging can be performed in several ways, as one skilled in the art will recognize. One embodiment, for example, saves the original imported trusted expense data and compares this with the data approved by the employee submitting the expense report and expense management system 100 notes, or flags, all discrepancies. Additionally, according to company controls, certain expense types or charges can be flagged for auditing, even if a change has not been made to the line item (e.g., if company policies forbid reimbursement for mini-bar or valet charges, then every time these expenses appear, they can be flagged for auditing). Expense management system 100 can perform the auditing function either manually or automatically through a programmed filter or tolerance, or through a combination or both. For example, expense management system 100 can be programmed to automatically approve all changes that are mapped to the "personal" expense type.

In step 235, after the report has been sufficiently audited (if this feature is used), then it becomes an approved expense report. In step 240, the approved expense report is used in myriad accounting and company functions.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments. In particular, it should be noted that, for example purposes, the above explanation has focused on the example of a hotel charge. However, those experienced in the art will realize that any charge with sub-transactions (e.g., a rental car charge) can be used.

In addition, it should be understood that the figures and screen shots, which highlight the functionality and advantages of the present invention, are presented for example purposes only. The architecture of the present invention is sufficiently flexible and configurable, such that it may be utilized in ways other than that shown in the accompanying figures. For example, the steps in the flowchart can be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

The invention claimed is:

1. A computerized method for expense management, comprising:
    performing, by a processor, processing associated with automatically detecting whether a credit card line item record created from a receipt record generated by processing an electronic feed of charges has been identified as a travel expense, the electronic feed of charges comprising computer-readable electronic transaction data received using a first computerized device, the computer-readable electronic transaction data comprising multiple expense receipt records sent directly from or on behalf of a lodging and/or transportation vendor using a second computerized device, the multiple expense receipt records comprising information on a sub-transaction comprising: amount information for the sub-transaction, written description information for the sub-transaction, and a code comprising numbers and/or letters which describes or categorizes the sub-transaction, the detecting comprising detecting the code within the electronic feed and analyzing the electronic feed to determine which amount information within the electronic feed corresponds to the code;
    performing, by the processor, processing associated with determining whether the code comprises an allowable expense as pre-determined by an entity policy, the determining comprising searching for and identifying a key word in the written description information for the sub-transaction where the code is found, the key word comprising a word or a partial word describing allowable expenses and non-allowable expenses, the determining further comprising analyzing database information to determine a mapping between the identified key word and the allowable expense;
    performing, by the processor, processing associated with identifying, based on a date of a charge of the electronic feed on credit card line item records, whether any of the credit card line item records identified occurred within a time period of an existing trip, the identifying being made by querying existing expense reports and trips stored in a database of the first computerized device;
    performing, by the processor, processing associated with automatically assigning any credit card line item records identified as an allowable expense and occurring during the time period for the existing trip for which one existing expense report exists, to the one of the existing expense reports, wherein the existing expense report comprises the written description information and the amount information allowing a traveler to be reimbursed for approved expenses; and
    performing, by the processor, processing associated with automatically creating a newly created expense report and assigning to the newly created expense report any credit card line item records identified as an allowable expense and occurring during the time period for the existing trip for which none of the existing expense reports exists, wherein the newly created expense report comprises the written description and the amount information allowing the traveler to be reimbursed for approved expenses.

2. The method of claim 1, wherein the existing expense report and/or the newly created expense report show the credit card line item records identified as occurring during the time period for the existing trip for which one of the existing expense reports exists associated with an expense type and/or the credit card line item records identified as occurring during the time period for the existing trip for which none of the existing expense reports exist associated with the expense type.

3. The method of claim 1, further comprising:
    performing processing associated with providing the existing expense report and/or the newly created expense report for approval;
    performing processing associated with providing the existing expense report and/or the newly created expense report for reimbursement; or
    performing processing associated with providing the existing expense report and/or the newly created expense report so that it can be integrated with other documents; or
    any combination thereof.

4. The method of claim 1, further comprising:
    performing processing associated with searching the credit card line item record for pre-defined criteria;
    performing processing associated with associating the code to an expense type;
    performing processing associated with allowing editing of the existing expense report and/or the newly created expense report;
    performing processing associated with allowing approval of the existing expense report and/or the newly created expense report; or performing processing associated with auditing the existing expense report and/or the newly created expense report by comparing at least two credit card line item data records with at least two expense itemizations on the existing expense report and/or the newly created expense report; or any combination thereof.

5. The method of claim 4, wherein the expense type comprises program-recognizable information.

6. The method of claim 4, further comprising:
performing processing associated with flagging edits of the existing expense report and/or the newly created expense report; and
performing processing associated with allowing explanations to be attached to each edit of the existing expense report and/or the newly created expense report.

7. The method of claim 6, wherein flagged edits to the existing expense report and/or the newly created expense report are made.

8. The method of claim 1, wherein each of the itemized sub-transactions is assigned to an expense type associated with an attribute comprising:
an identifier;
a description;
a general ledger;
a list of data fields to be supplied on the existing expense report and/or the newly created expense report; or
corporate policy information; or
any combination thereof.

9. The method of claim 8, wherein the expense type is additionally comprised of semantic information describing a type of expense.

10. The method of claim 9, wherein the semantic information comprises the identifier of the expense type.

11. The method of claim 1, wherein the credit card line item record contains information identifying an expense, where possible expense identifications are determined by a vendor producing the credit card line item record.

12. The method of claim 11, further comprising performing processing associated with associating the expense identification determined by the vendor producing an expense data record to a master expense identification on a master expense type list.

13. The method of claim 12, wherein an expense itemization is automatically assigned to an expense type based on associating the expense type determined by the vendor producing the credit card line item data record to the master expense type on the master expense type list.

14. The method of claim 4, further comprising:
performing processing associated with allowing editing of the existing expense report and/or the newly created expense report; and
performing processing associated with auditing the existing expense report and/or the newly created expense report by comparing edits to the credit card line item record from the lodging and/or transportation vendor.

15. The method of claim 1, wherein the method is customizable to incorporate policies, desires, and/or tax considerations for an entity using the method to assist in creating existing expense reports and/or the newly created expense reports for its employees.

16. The method of claim 1, wherein the transportation and/or lodging good and/or service comprises: a lodging room rental, a tax, internet access, a telephone call, food and/or beverage from an eating establishment, an item from a mini-bar, a service from a business center, room service, gym or health club access, an item from a hotel store, banquet facility rental, a gratuity, laundry service, parking, limousine service, a movie, audio and/or video equipment rental, a cash advance, a conference room rental, an early departure fee, an automobile rental, insurance, fuel, extra mileage, or equipment repair, or any combination thereof.

17. The method of claim 1, wherein:
the processor also receives an additional electronic feed of charges containing multiple receipt records for lodging and/or transportation expense from a credit card vendor, and the processor automatically detects that a transaction appears only in the electronic feed of charges received from the credit card vendor;
the transaction is comprised of two or more line items;
the processor automatically maps the two or more line items to a transportation and/or lodging good and/or service that is chargeable to an account identifier, the mapping utilizing the code and/or the key word, and results of the mapping stored in a database;
the processor automatically retrieves the mapping from the database;
the processor automatically pre-populates the transportation and/or lodging good and/or service mapped to each of the two or more line items from the receipt record on existing expense report and/or the newly created expense report in an expense management system as two or more expense itemizations;
the expense receipt record is added to the existing expense report and/or the newly created expense report as expense item which is marked as being comprised of the two or more expense itemizations corresponding to the two or more line items; and
each expense itemization added from the expense receipt record to the existing expense report and/or the newly created expense report corresponds to exactly one of the two or more line items.

18. A computerized system for expense management, comprising:
a computerized device configured for:
automatically detecting whether a credit card line item record created from a receipt record generated by processing an electronic feed of charges has been identified as a travel expense, the electronic feed of charges comprising computer-readable electronic transaction data received using a first computerized device, the computer-readable electronic transaction data comprising multiple expense receipt records sent directly from or on behalf of a lodging and/or transportation vendor using a second computerized device, the multiple expense receipt records comprising information on a sub-transaction comprising: amount information for the sub-transaction, written description information for the sub-transaction, and a code comprising numbers and/or letters which describes or categorizes the sub-transaction, the detecting comprising detecting the code within the electronic feed and analyzing the electronic feed to determine which amount information within the electronic feed corresponds to the code;
automatically determining whether the code comprises an allowable expense as pre-determined by an entity policy, the determining comprising searching for and identifying a key word in the written description information for the sub-transaction where the code is found, the key word comprising a word or a partial word describing allowable expenses and non-allowable expenses, the determining further comprising analyzing database information to determine a mapping between the identified key word and the allowable expense;

automatically identifying, based on a date of a charge of the electronic feed on credit card line item records, whether any credit card line item records identified occurred within a time period of an existing trip, the identifying being made by querying existing expense reports and trips stored in a database of the first computerize device;

automatically assigning any credit card line item records identified as an allowable expense and occurring during the time period for the existing trip for which one existing expense report exists, to the one of the existing expense reports, wherein the existing expense report comprises the written description information and the amount information allowing a traveler to be reimbursed for approved expenses; and automatically creating a newly created expense report and assigning to the newly created expense report any of the credit card line item records identified as the allowable expense and occurring during the time period for the existing trip for which none of the existing expense reports exists, wherein the newly created expense report comprises the written description and the amount information allowing the traveler to be reimbursed for approved expenses.

19. The system of claim 18, wherein the existing expense report and/or the newly created expense report show the credit card line item records identified as occurring during the time period for the existing trip for which one of the existing expense reports exists associated with an expense type and/or the credit card line item records identified as occurring during the time period for the existing trip for which none of the existing expense reports exist associated with the expense type.

20. The system of claim 18, wherein the processor is further configured for:
performing processing associated with providing the existing expense report and/or the newly created expense report for approval;
performing processing associated with providing the existing expense report and/or the newly created expense report for reimbursement; or
performing processing associated with providing the existing expense report and/or the newly created expense report so that it can be integrated with other documents; or
any combination thereof.

21. The system of claim 18, wherein the processor is further configured for:
performing processing associated with searching the credit card line item record for pre-defined criteria;
performing processing associated with associating the code to an expense type;
performing processing associated with allowing a user to edit the existing expense report and/or the newly created expense report;
performing processing associated with allowing a user to approve the existing expense report and/or the newly created expense report; or performing processing associated with auditing the existing expense report and/or the newly created expense report by comparing at least two credit card line item data records with at least two expense itemizations on the existing expense report and/or the newly created expense report; or
any combination thereof.

22. The system of claim 21, wherein the expense type comprises program-recognizable information.

23. The system of claim 21, wherein the processor is further configured for:
performing processing associated with flagging where the user edits the existing expense report and/or the newly created expense report; and
performing processing associated with allowing the user to attach an explanation to each edit of the existing expense report and/or the newly created expense report.

24. The system of claim 23, wherein a second user audits a flagged edit to the existing expense report and/or the newly created expense report.

25. The system of claim 18, wherein each of the itemized sub-transactions is assigned to an expense type associated with an attribute comprising:
an identifier;
a description;
a general ledger;
a list of data fields to be supplied on the existing expense report and/or the newly created expense report; or
corporate policy information; or
any combination thereof.

26. The system of claim 25, wherein the expense type is additionally comprised of semantic information describing a type of expense.

27. The system of claim 26, wherein the semantic information comprises the identifier of the expense type.

28. The system of claim 18, wherein the credit card line item record contains information identifying an expense, where possible expense identifications are determined by a vendor producing the credit card line item record.

29. The system of claim 28, wherein the processor is further configured for performing processing associated with associating the expense identification determined by the vendor producing an expense data record to a master expense identification on a master expense type list.

30. The system of claim 29, wherein an expense itemization is automatically assigned to an expense type based on associating the expense type determined by the vendor producing the credit card line item data record to the master expense type on the master expense type list.

31. The system of claim 21, wherein the processor is further configured for:
performing processing associated with allowing a user to edit the existing expense report and/or the newly created expense report; and
performing processing associated with auditing the existing expense report and/or the newly created expense report by comparing edits of the user to the credit card line item record from the lodging and/or transportation vendor.

32. The system of claim 18, wherein the method is customizable to incorporate policies, desires, and/or tax considerations for an entity using the method to assist in creating existing expense reports and/or the newly created expense reports for its employees.

33. The system of claim 18, wherein the transportation and/or lodging good and/or service comprises: a lodging room rental, a tax, internet access, a telephone call, food and/or beverage from an eating establishment, an item from a mini-bar, a service from a business center, room service, gym or health club access, an item from a hotel store, banquet facility rental, a gratuity, laundry service, parking, limousine service, a movie, audio and/or video equipment rental, a cash advance, a conference room rental, an early departure fee, an automobile rental, insurance, fuel, extra mileage, or equipment repair, or any combination thereof.

34. The system of claim 18, wherein:
the processor also receives an additional electronic feed of charges containing multiple receipt records for lodging and/or transportation expense from a credit card vendor, and the processor automatically detects that a transaction appears only in the electronic feed of charges received from the credit card vendor;
the transaction is comprised of two or more line items;
the processor automatically maps the two or more line items to a transportation and/or lodging good and/or service that is chargeable to an account identifier, the mapping utilizing the key code and/or the key word, and results of the mapping stored in a database;
the processor automatically retrieves the mapping from the database;
the processor automatically pre-populates the transportation and/or lodging good and/or service mapped to each of the two or more line items from the receipt record on an existing expense report and/or the newly created expense report in an expense management system as two or more expense itemizations;
the expense receipt record is added to the expense report as expense item which is marked as being comprised of the two or more expense itemizations corresponding to the two or more line items; and
each expense itemization added from the expense receipt record to the existing expense report and/or the newly created expense report corresponds to exactly one of the two or more line items.

* * * * *